US006769117B2

(12) United States Patent
Moore

(10) Patent No.: US 6,769,117 B2
(45) Date of Patent: Jul. 27, 2004

(54) GENERALISED PROGRAM HOOKS

(75) Inventor: Richard John Moore, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 09/899,638

(22) Filed: Jul. 5, 2001

(65) Prior Publication Data

US 2002/0029374 A1 Mar. 7, 2002

(30) Foreign Application Priority Data

Jul. 14, 2000 (GB) .............................................. 0017201

(51) Int. Cl.$^7$ ................................................. G06F 9/44
(52) U.S. Cl. ...................... 717/130; 717/131; 717/127; 717/128; 714/34; 714/35; 714/47; 712/227; 709/230
(58) Field of Search ................................ 717/127–131, 717/140; 714/34, 35, 47; 712/227; 709/230

(56) References Cited

U.S. PATENT DOCUMENTS

| | | | | | |
|---|---|---|---|---|---|
| 4,821,178 | A | * | 4/1989 | Levin et al. .................... | 714/47 |
| 5,710,724 | A | * | 1/1998 | Burrows ....................... | 714/34 |
| 6,026,235 | A | * | 2/2000 | Shaughnessy ................ | 717/127 |
| 6,219,782 | B1 | * | 4/2001 | Khan et al. .................. | 712/227 |
| 6,340,977 | B1 | * | 1/2002 | Lui et al. ..................... | 345/709 |
| 6,578,194 | B1 | * | 6/2003 | Baumgart et al. ........... | 717/140 |
| 6,587,967 | B1 | * | 7/2003 | Bates et al. .................... | 714/35 |
| 6,678,734 | B1 | * | 1/2004 | Haatainen et al. ........... | 709/230 |
| 6,681,384 | B1 | * | 1/2004 | Bates et al. .................. | 717/129 |

OTHER PUBLICATIONS

Title: A Sclable Architecture for Multi–threaded JAVA Applications, author: Mrva et al, IEEE, 1998.*
Title: OCM–A Monitoring System for Interoperable Tools, author: Wismuller et al, ACM, 1998.*
Title: Debugging Concurrent Programs, author: Mcdowel et al, ACM, 1989.*

* cited by examiner

Primary Examiner—Chameli Chaudhuridas
(74) Attorney, Agent, or Firm—William A. Kinnaman, Jr.

(57) ABSTRACT

A hook interface module cooperates with a kernel whose functionality is being modified and with kernel modules providing modified functionality. The kernel includes symbols indicating execution points where modification is permitted. The hook interface module resolves an address for each symbol and maintains a list of any modification functions associated with each symbol. An API exposes a registration method for enabling the kernel modules to register a modification function for a symbol and add an indicator for the modification function to the list for the symbol. An arming method enables the kernel modules to arm modification functions associated with the symbols. This modifies the address contents for each symbol to cause program execution at the symbol address to jump to a location in the hook interface module. A dispatcher responds to this and causes execution to jump to any modification function associated with a symbol from which execution has jumped.

14 Claims, 2 Drawing Sheets

GENERALISED PROGRAM HOOKS

BACKGROUND OF THE INVENTION

1. Field of the Invention

The present invention relates to an interface module and method for allowing other modules to gain control at specified points in the execution of a program for the purpose of providing modified functionality to that of the program. The invention is particularly applicable to enhancements that provide some form of system instrumentation such as monitoring and measuring capability for performance and diagnostic purposes.

2. Description of the Related Art

In the case of, for example, the Linux operating system, the normal mechanism for making modifications to the kernel is to modify the kernel source code directly and recompile the kernel. Since the kernel source is distributed to the user, modifications are usually applied by the user, by means of an automated script containing embedded source code, known as a patch. The user recompiles the kernel together with any kernel version-dependent modules to install the patch.

This has a number of disadvantages:

1. Whenever a new version of the kernel is released, which may be merely a maintenance release, the modification nevertheless has to be reapplied to the kernel.
2. The patch for applying the modification may have to be reworked for the new kernel version.
3. The modification code itself may have to be reworked to fit in with any new kernel code that directly affects the modification, which may be due in part to a stylistic organisational change in the kernel source and not necessarily a significant change in the kernel function.
4. If the modification itself needs to be changed, then this forces a rework of the patch and a subsequent recompilation of the kernel and any kernel-dependent modules.
5. If the user wishes to apply additional patches to the kernel then it is the user's responsibility to rework the patches so that they will coexist.
6. Compilation and installation of the kernel and associated modules is a lengthy task that requires the system to be restarted to become active.

Most modifications, for example, tracing, logging, debugging or other instrumentation tools, however, are usually made to insert additional or enhanced function rather than replace kernel function.

One technique used relatively broadly to allow for the addition of functionality to a general purpose program is the inclusion of exits in the source code of the program. Although, implementable in many different ways, one way to implement exits entails the user who provides modification code, knowing the location or label of an exit, having the modification code, when loaded, overwriting an exit location in the program with an entry point location in the modification code, enabling the modification code to take over program control at the exit, carry out some processing and return at the instruction following the exit. Here, the underlying function and structure of the program remains intact and so long as the exits continue to be provided from one program release to the next, users remain unaffected and neither do they need to have access to the program source code.

This technique, however, is usually employed by users (including enterprise users) of an object code only (OCO) commercial off-the-shelf (COTS) program, where the modifications to the code are specific to the user and controlled by the user.

In the case of programs such as the Linux operating system, however, development of operating system tools takes place within a diverse community of developers who in turn submit their tools for distribution with the operating system to end users.

It is therefore not possible or desirable to require each tool developer to take into account the needs of other developers when developing new tools. Without this knowledge, it is possible that more than one tool may end up vying to access an exit. The tool gaining access to the exit, that is the tool writing its entry point location into the exit location, may be determined by the order in which tools are instantiated and so may lead to non-deterministic or unpredictable operation or even failure of the operating system.

SUMMARY OF THE INVENTION

Accordingly, the present invention provides an interface module according to claim 1.

BRIEF DESCRIPTION OF THE DRAWINGS

A preferred embodiment of the invention will now be described in detail by way of example only with reference to the following drawings.

Figure 1:
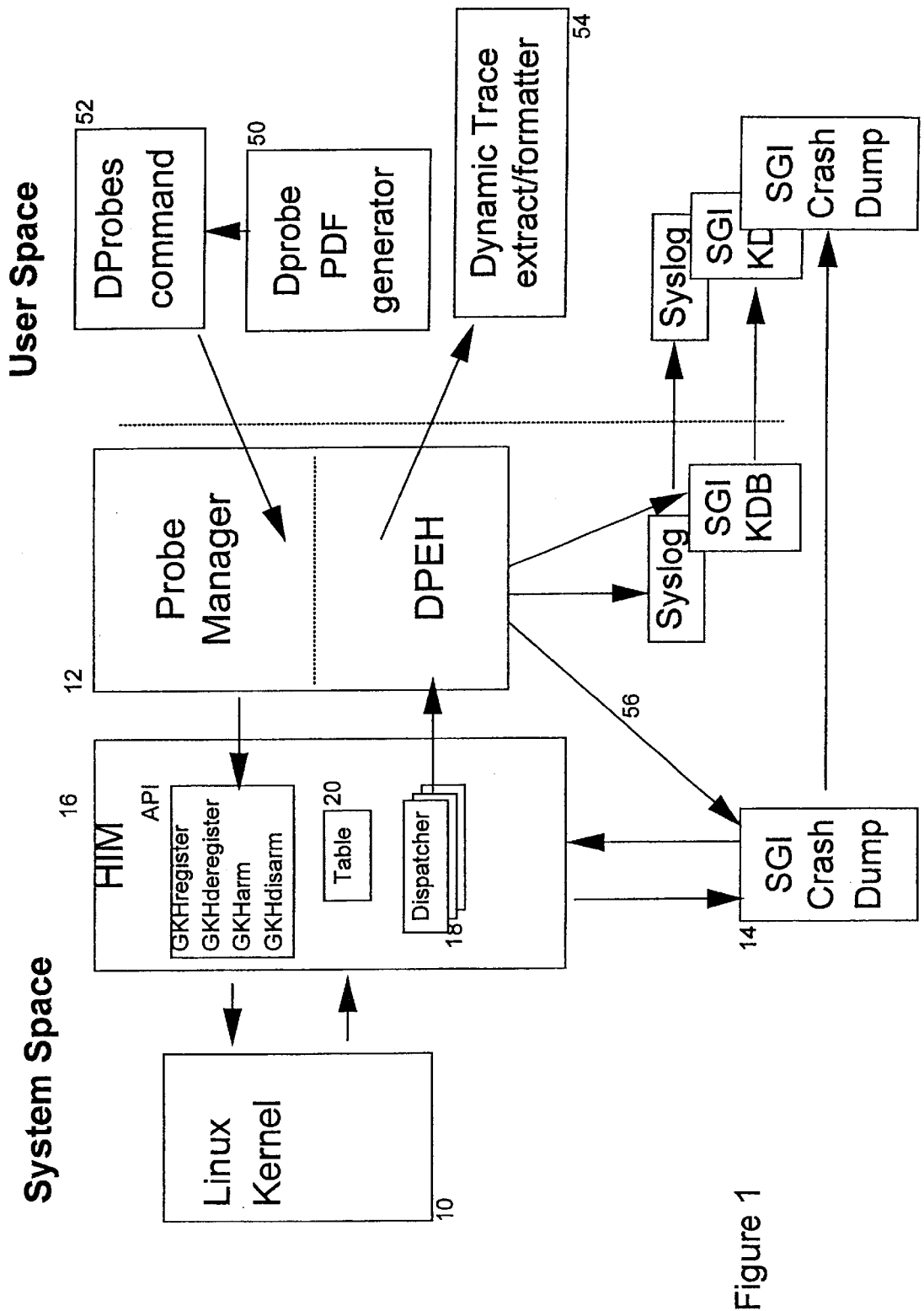
FIG. 1 is a block diagram of an operating system kernel and a hook interface module according to the invention.

In the preferred embodiment of this invention, the program to be modified is the Linux operating system kernel running on an Intel processor. However, the invention applies to any program or operating system on any hardware platform that supports a mechanism for identifying, externally to the program, arbitrary code locations.

In Linux this is achieved by declaring a global symbol, that is, a symbolic reference to the code location that may be referenced externally to the kernel. Global symbols can be correlated to their memory locations by, for example, calling the get_kernel_syms Kernel Programming Interface (KPI) or coding external references within the interface module corresponding to global symbols within the kernel.

In the present description, a global symbol that is declared in the kernel for the purposes of identifying a location at which a modification or enhancements may be made is referred to as a hook location; the small amount of code inserted at the hook location is referred to as a hook; and the modification function that is given control at a hook location is referred to as a hook exit.

In the case of the preferred embodiment, the modification functionality uses kernel code and both needs to address and be addressable within kernel space. As such, the modification code takes the form of privilege mode modules 12, 14. In Linux these are referred to as Kernel Modules, in OS/2 or Windows these are referred to as device drivers.

The invention provides a hook interface module 16 which cooperates with hook locations defined, in the case of the present embodiment, within the kernel 10 and that dynamically:

1. allows kernel modules 12,14 to register routines as hook exits,
2. allows kernel modules 12,14 to de-register hook exits,
3. allows a given kernel module 12,14 to simultaneously arm a group of one or more hook exits,
4. allows a group of hook exits to become disarmed, and
5. allows more than one kernel module 12,14 to register and arm a hook exit for a given hook.

Thus, kernel modifications can be installed and activated dynamically without needing to reboot the machine for the modifications to take effect.

Deciding where to place hooks in the kernel is dependent on the modification in question. However, there tends to be certain places that are hooked for a variety of reasons. Such hooks need only be created once for all hook exits. As will be explained below, the hook itself may be encoded as a single line change in the kernel source by using C language macros in the case of the Linux kernel. Thus, the installation of new hooks is relatively trivial compared with insertion of modification code. Furthermore each hook is preferably coded in a consistent way throughout the kernel and comprises the following:

1. A global symbol that identifies the start of the hook;
2. A global symbol that identifies the return point from the hook exit routine back to the kernel;
3. A global symbol that identifies the end of the hook;
4. A jump instruction that bypasses the hook code by jumping to the symbol named in step 3. This is the only instruction to be executed by default and therefore the only overhead for placing a hook in the kernel source until one or more hook exits become armed for this particular hook. When this happens the jump instruction is replaced by 3 NOP instructions, thereby allowing control to pass through to a hook dispatcher routine 18 in the hook interface module 16. Preferably, each hook has an associated dispatcher routine 18 as the use of a per-hook dispatcher avoids the need to pass a hook number as a parameter.
5. An optional series of LEAL (Load effective address long) and PUSHL (Push Long) instructions to place parameters onto the stack. These allow local variables of the routine in which the hook resides to be exposed to the hook exit. Parameters are passed indirectly as their address using the C-calling convention to be consistent with a hook exit coded in the C language.
6. A PUSHL instruction that places on the stack the number of optional parameters passed in step 5. This should tell the hook exit that it has popped the correct number of parameters from the stack and is therefore operating with a compatible hook.
7. A sequence of five NOP instructions, which will become populated with a jump to the hook dispatcher routine 18 in the hook interface module, once the hook interface module 16 becomes active.
8. An ADDL (Add Long) instruction that adjusts the Extended Stack Pointer to remove the pushed parameters in accordance with the C-calling convention which expects that it is the routing calling a function which uses stack parameters to cleanup the stack.

In the preferred embodiment, this assembly language encoding can be achieved by using the in-line assembly feature of the Linux GCC C-language compiler, which is used to compile the kernel. For example, a hook defined to pass 2 parameters would be coded as follows:

```
asm volatile    (" .global GKHook001;
                 .global GKHook001_ret;
                 .global GKHook001_bp;
                 GKHook001: jmp GKHook001_bp;
                         /* replace with nop;nop;nop; to
activate */
                 leal %1, %%eax
                 push %%eax;     /* push address of
parm 1 */
                 leal %0, %%eax
                 push %%eax;     /* push address of
parm 0 */
                 push $2;        /* push number of
parameters */
                 Nop;nop;nop;nop;nop;
                         /* replace with jmp GKHook001_dsp when
active */
                 GKHook001_ret: add $12, %%esp; /* clean up
stack */
                 GKHook001_bp: ;
                 " : : "m" (parm0),   "m" (parm1) : "%eax")
```

Furthermore this construct can be reduced to a single line by defining it as a macro thus:

```
#define GKHOOK_2VAR_RO(h, p0, p1) asm volatile (".global
GKHook"h";
            .global GKHook"h"_ret;
            .global GKHook"h"_bp;
            GKHook"h": jmp GKHook"h"_bp;
                    /* replace with nop;nop;nop; to
activate */
            leal %1, %%eax;
            push %%eax;
            leal %0, %%eax;
            push %%eax;
            push $2;
            Nop;nop;nop;nop;nop;
                    /* replace with jmp GKHook"h"_dsp when
active* /
            GKHook"h"_ret: add $12, %%esp;
            GKHook"h"_bp: ; " : : "m" (p0),   "m" (p1) : "%eax")
```

The hook would be encoded in kernel source as:

GKHOOK_2VAR_RO(001,parm0,parm1);

Hook locations are designated a unique numeric identifier. In the example above the identifier is 001. For convenience each identifier is assigned a symbolic synonym. For example if hook 001 were located at the entry point to the trap3 function in the kernel then the hook identifier could be identified as:

define GKH_trap3_entry 0001 and the hook encoded as:

GKHOOK_2VAR_RO(GKH_trap3_entry,parm0, parm1);

The example given above assume two parameters are passed for read-only purposes, hence the RO suffix to the macro name. A minor modification to the macro would allow the parameters be used in a read/write manner by the hook exit, however, this may cause the GCC compiler to generate additional code for preserving and updating temporary copies variables that might have been changed by the exit. So as not to impose this overhead unnecessarily a read/write version of each hook macro is defined. The read/write version of the example above would be defined as follows:

```
#define GKHOOK_2VAR_RW(h, p0, p1) asm volatile (".global
GKHook"h";
            .global GKHook"h"_ret;
            .global GKHook"h"_bp;
            GKHook"h": jmp GKHook"h"_bp;
                        /* replace with nop;nop;nop; to
activate */
            leal %1, %%eax
            push %%eax;
            leal %0, %%eax;
            push %%eax;
            push $2;
            Nop;nop;nop;nop;nop;
                        /* replace with jmp GKHook"h"_dsp when
active*/
            GKHook"h"_ret: add $12, %%esp;
    GKHook"h"_bp: ; " : "=m" (p0),  "=m" (p1) : "0" (p0),
"1" (p1) : "%eax")
```

A hook may be in an active (default) or inactive state, and these are defined as follows:

An inactive hook is one in which the only instruction executed is the jump instruction at the beginning of the hook, which bypasses the rest of the hook.

An active hook is one where the bypassing jump instruction has been replaced by no-op instructions (3 NOPs) and the 5 NOPs that precede the return label have been populated with a jump instruction with a target address of the hook dispatcher routine 18 for this hook within the hook interface module. The hook interface module 16 uses address information saved during its initialisation by calling, for example, the get_kernel_syms interface to locate the instructions that must be altered on activation (and subsequent deactivation).

A hook is made active when at least one exit registered for this hook becomes armed. Using the example above, when active, the assembler instructions forming the hook are equivalent to:

```
asm volatile    (" .global GKHook001;
                .global GKHook001_ret;
                .global GKHook001_bp;
                GKHook001: nop;nop;nop;
                        leal %1, %%eax
                        push %%eax; /* push address of
parm 1 */
                        leal %0, %%eax
                        push %%eax; /* push address of
parm 0 */
                        push $2;   /* push number of
parameters */
                        jmp GKHook001_dsp;
                GKHook001_ret: add $12, %%esp; /* clean up
stack */
                GKHook001_bp: ;
                ": : "m" (parm0),  "m" (parm1) : "%eax")
```

A hook is made deactive when no more hook exits are registered for that hook.

In the preferred embodiment, the hook interface module is loaded using the Linux insmod utility. The hook interface module includes an init_module routine which performs the following sequence of operations:

1. extract kernel public symbols using the get kernel syms function.

This provides a cross-reference table of global kernel symbol names to their memory addresses.

2. for each kernel hook, locate the addresses of each of the three global symbols and save these, per hook in an internal table status table 20.

The entry symbol (GKHook001 in the example above) is used to locate the jump instruction that is change to three NOP instructions on hook activation.

The return symbol (GKHook001_ret in the example above) has 5 subtracted to locate the sequence of 5 NOP instructions that are populated with a jump to the hook dispatcher routine 18 when the hook becomes active.

The dispatcher routine also needs to return to the hook once the modification function—the hook exit—completes and so the return symbol within the hook is also used to populate the target address of a jump instruction in the dispatcher routine 18 for that hook.

This initialisation stage allows hook exits to be loaded, registered, armed and disarmed dynamically.

It should be noted that, in the preferred embodiment, a hard-coded external reference from the kernel to another module would not be possible, since that module would have to be brought into memory before the kernel, but the kernel would be required to be in memory to load the module. This conflict therefore debars the modularization of the kernel in the conventional way in which module functionality is normally allowed to be split over multiple executable load modules.

The hook interface module 16, in turn, provides an API comprising four methods for kernel modules 12, 14 to call. These are:

GKHregister—This is used to register an entry-point in a kernel module that will become a hook exit.

Figure 2:
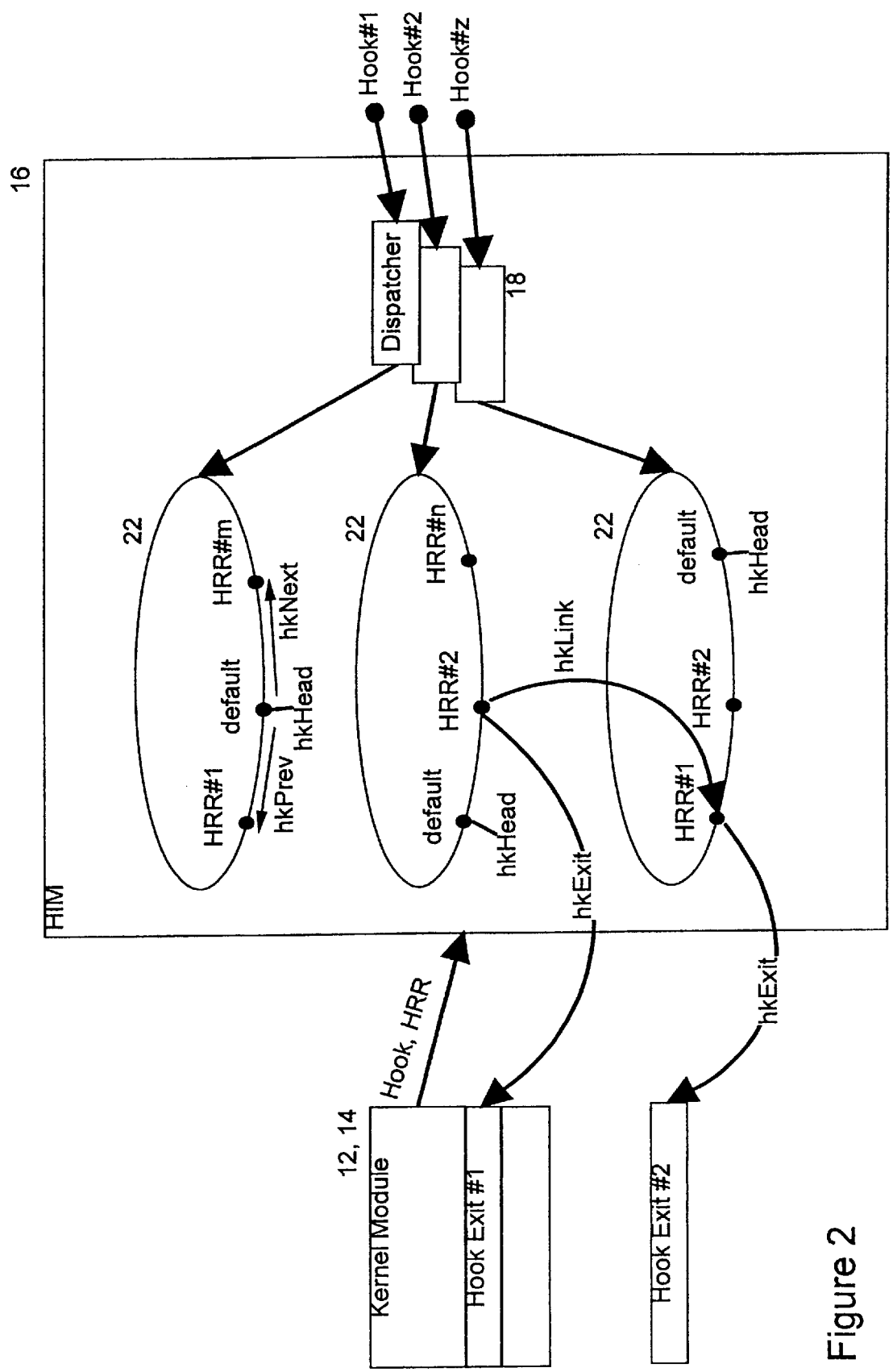
FIG. 2 is a block diagram of kernel modules co-operating with the hook interface module of the invention.

When this method is called, the hook interface module is passed: the hook number and a hook registration record (HRR), FIG. 2. (The hook registration record is required to be allocated from persistent system memory, so that it can be later referenced by both the hook interface module and the kernel module during hook dispatching, de-registration, arming and disarming.) The hook registration record is of the following structure:

```
typedef struct {
    void * hkExit;
    void * hkNext;
    void * hkPrev;
    unsigned int hkFlag;
    void * hkLink;
    void * hkHead;
    unsigned int hkIndex;
} gkhook_t;
```

Each hook has an associated ordered double-linked list (represented by a loop 22), and registration amounts to inserting the hook registration record into the double-linked list of registered exits for the hook in question.

Thus, each HRR includes a hkPrev and hkNext pointer to the next lower/higher priority exit on the list of registered exits by which the list may be traversed. These pointers are populated by the hook interface module when inserting the HRR in the list 22. HkHead is a pointer to the head of the double-linked list 22 in which the HRR lies. This pointer is also set by the hook interface module on registration and is used as a validity check when the HRR is subsequently used in an Arm, Disarm or De-register operation.

The registration record also contains an integer (hkindex) through which the registration method returns an index indicating the dispatching order and so priority of the hook exit—that is the number of HRRs lower than the hkHead, a given HRR lies in the list 22 (The HRR with hkindex=1 will be pointed to by the hkPrev pointer of the hkHead HRR.)

The hook dispatcher relies on position on the linked list to determine dispatching order and so the higher the number the lower the priority.

In the preferred embodiment, hkindex is used by the hook interface module as a value to return at registration time. The only significant value is 1, which indicates that the hook exit was the first to register for a given hook.

If, on the other hand, hkindex is set by the kernel module to, say 1 if it wishes its hook exit to be highest priority or another higher number for a specified lower priority, when passing the HRR to the hook interface module, then the hook interface module, will attempt to place the HRR for this hook exit at the highest available At place in the list 22 for the hook. Registration succeeds if no more than the specified number of other hook exits have requested that their index be fixed at a higher priority (i.e . . . a lower number). If so, registration for the hook exit will fail, and it is up to the kernel module to decide if it wishes to reregister the hook exit with a lower priority. If not, registration succeeds.

Furthermore, the kernel module could set hkindex with a predefined number, for example 0×FFFFFF, to indicate that it wishes the HRR to be placed last in the list 22, that is the HRR should be pointed to by hkNext pointer of the hkHead HRR.

The hook registration record further contains the address of the hook exit entry point (hkExit) and a flag (hkFlag). As illustrated in the example of FIG. 2, the hook exit need not be a location within the registering kernel module 12, 14 and can in fact reside anywhere, as in the case of Hook Exit #2. The flag is used by both the kernel module and the hook interface module, with:
1. the hook interface module setting a state portion of the flag to indicate whether a hook exit is armed, disarmed, registered or de-registered;
2. the kernel module setting a second portion of the flag to indicate whether this exit is to be the only exit registered for a given hook; and
3. The kernel module setting a third portion of the flag to indicate if any serialisation (locking), such as disabling interrupt or spinning other CPUs, needs to be performed before the hook exit is called.

This second portion of the flag can in fact be subdivided into a first sub-portion to allow the kernel module to indicate it wishes its hook exit to be the first dispatched hook exit, and a second sub-portion to allow the kernel module to indicate it wishes its hook exit to be the last hook exit. If both are set then the hook exit will be the only allowed hook exit. This allows a dispatch priority insensitive hook exit to register before a priority sensitive exit and for the latter to acquire its desired priority.

Registration returns a failure/success indication. Failure can occur:
1. if the flag was set to indicate that the exit was to be the only exit and another exit was already registered for a hook;
2. if the hook is defined as supporting only one exit and one is already registered;
3. if the hook exit is already registered for the hook;
4. if the hook number is invalid.

Once registered, a hook may be de-registered or armed. The hook exit will not be called until it is armed.

GKHderegister—This is used to de-register one or more hook exits. De-registration involves removing knowledge of the hook exit by deleting the HRR from the linked list 22 corresponding to a hook to be de-registered and correcting the hkNext and hkPrev pointers for the previous and next hook registration records in the list 22, and adjusting the hkindex values for lower priority hook registration records in the list 22

GKHderegister is in fact passed a linked list of one or more hook registration records. If any hook in the list is armed (see GKHarm below) then it is disarmed before being de-registered. A failure/success indication is returned to the caller. Failure can occur if a hook exit was not previously registered.

Note: it is the responsibility of the kernel module 12, 14 registering hook exits to de-register them explicitly when, for example, its cleanup_module routine is called during module termination.

GKHarm—Make a set of hook exits dispatchable.

Arming a hook exit comprises marking the exit eligible for being called (or dispatched). Each registered exit has a status portion of the hkFlag, indicating whether or not the hook exit may be called. When the first hook exit is armed for a particular hook, the hook is made active, by replacing the bypassing jump instruction and the nop instructions for the hook as explained above.

In order to support group arming, disarming and de-registration, in the preferred embodiment, the registration record also contains a link pointer (hkLink). When a kernel module has registered more than one hook exit for associated hooks, before arming the hooks described above, its goes to the corresponding HRR in the hook's list 22, and sets the hkLink pointer to the HRR of the next hook. In the case of FIG. 2, the kernel module has registered hook exits for hook#2 and hook#z. Before arming the hooks, the kernel module goes to HRR#2 of the double-linked list 22 for hook#2 and sets its hkLink pointer to point to HRR#1 of the double-linked list 22 for hook#z. The hkLink pointer for HRR#1 is set to null as this lies at the end of the list of hook exits to be armed.

GKHarm is passed a pointer to the first HRR in a linked list of HRRs. It first checks if it is possible to arm all HRRs in the list and if so attempts to do so. If the check fails, then GKHarm returns a fail without arming any of the HRRs.

GKHdisarm—Make a set of hook exits non-dispatchable.

Disarming comprises setting the hook exit status accordingly and if no exits are left armed for a given hook then the hook is made deactive by inserting the jump instruction at the start of the hook and replacing the call to the hook dispatcher with nop's.

The disarm function is also passed linked list of registration records that have previously been registered. Disarming an already disarmed exit is treated as a null operation. Failure indication is only given if the hook exit has not been registered.

In this case, it will be seen that the overhead of ensuring that the correct registration records are chosen for disarming lies with the kernel module which builds the list supplied to GKHdisarm. This gives flexibility in selecting which HRRs to disarm. On the other hand, GKHdisarm could instead receive a pointer to the first HRR in a list linked by hkLink pointers, and simply traverse this list disarming these HRR's.

Whenever the hook interface module modifies code it takes the following precautions to ensure predictable results while the modification is being made:
1) In a multiprocessor environment an inter-processor communication mechanism, such as the inter-processor interrupt (IPI) defined by Linux, is used to signal to each of the other processors to spin with interrupts disabled until signalled to resume normal operation. Under Linux the IPI signals each target processor to call a specified function via the smp_call_function service. The specified function (GKHspin) is implemented in the hook interface module and does the following:

Disables interrupts.
Set a variable known as GHKspinlock to a non-zero value. Continuously tests the variable until it is zero. When zero, enables interrupts and returns to the system.
2) Disables interrupts to avoid recursion on the same processor.
3) After any code modifications are made, an instruction, for example Store CPUID on Intel, is used to cause the processor to flush any pre-fetched instructions.
4) In a multiprocessor environment cause all spinning processors to resume normal operation but using either an inter-processor communications mechanism supplied by the operating system, or directly by changing a value in memory on which each of the spinning processes is continually testing. The latter method is employed in the Linux implementation.

Once one or more hook exits are armed they will be called by a dispatching routine 18 within the hook interface module 16 whenever the kernel code containing the corresponding hook is executed.

Beginning at the HRR pointed to by the hkPrev pointer of the HRR pointed to by hkHead, the dispatcher traverses the linked list 22 of registered hook exits for its particular hook. Only hook exits in the armed state are used. For each armed hook exit the dispatcher will call the exit's entry point (hkExit) having first saved the address of the current registration record as a parameter on the stack. This provides an easy way for the dispatcher to restore its state on return from the hook exit. It also allows the hook exit to change its status by updating the flag (hkFlag) in the registration record. This provides a dispatch-once facility but also allows locking conditions to be altered without de-registering or disarming the hook exit.

When the hook exit returns to the dispatcher, the return code (EAX register in the case of Linux on Intel platforms) is examined. If, non-zero then no further exits in the linked list are dispatched on this occasion and the dispatcher returns immediately to the kernel.

For performance reasons, the hook interface module internally registers per hook a default exit which is always called last, i.e. its HRR will be pointed to by hkHead. This exit sets the return code to 1 thus causing the dispatcher to return to the kernel. The performance saving occurs when more than one exit is registered for a hook by avoiding a test for last exit, i.e. that is checking for hkHead, each time the previous exit returns to the dispatcher. It also provides performance savings when registering and de-registering exits, since the boundary condition when no-exits are registered never occurs.

Also, to cater for the case where an exit might update the exit status by changing the status portion of hkFlag in the registration record directly to disarm the HRR, the hook interface module can be set to call GKHdisarm later passing the address of the HRR which disarmed itself. The disarm for this HRR will be null, but causes GKHdisarm to check if all exits are disarmed and if so, the hook interface module deactivates the hook.

In a refinement of the preferred embodiment, kernel modules can identify additional hooks after the hook interface module has initialised, and remove a hook completely from the hook interface module.

In this case, the HRR pointed to by hkHead is a special head registration record. As in the preferred embodiment, the hook exit for this HRR is the default hook exit which causes the HIM to return to the kernel. The head registration record is an extension of the regular HRR and contains additional fields that identify the hook location and chain the hook head registration records together. Furthermore, the status flag stores an additional value to show whether the hook has been activated or not. The structure of the hook head registration record is:

```
typedef struct {
    void * hkExit;
    void * hkNext;
    void * hkPrev;
    unsigned int hkFlag;
    void * hkLink;
    void * hkHead;
    unsigned int hkIndex;
    void * hkHeadNext;
    void * hkpHook;
    void * hkpHook_ret;
    void * hkpHook_pb;
    unsigned int hkHookId;
} gkhookhead_t;
```

The additional fields are defined as follows:

```
hkHeadNext
    Pointer to the next head record.
hkpHook
    Pointer to the hook location.
hkpHook_ret
    Pointer to the hook return point.
hkpHook_bp
    Pointer to the hook bypass point.
hkHookId
```

The hook identifier. (This could alternatively be a string, although strings are more complicated to manipulate.)

Each of these fields is populated by the hook interface module during initialisation of the standard set of hooks.

The hook interface module then offers an additional interface to allow kernel modules to identify additional hook locations after the hook interface module has initialised.

GKHIdentify—Used to identify a hook in a kernel module.

Identify is passed the address of the hook identifier and uses the kernel symbols extracted with get_kernel_syms to locate the new hook, build a default hook exit, head hook registration record and hook dispatcher routine.

An error is returned if the hook is already identified or if the hook cannot be located.

GKHDelete—Used to delete a hook from hook interface module's management.

Delete is passed the hook identifier and a force flag. Deletion comprises removal of the head hook registration record. After deletion, no further registration for that hook is permitted. If the force flag is zero the hook will only be deleted if inactive. If non-zero a force-delete function is performed in which all registered and armed hooks are disarmed and de-registered.

It will therefore be seen that the preferred embodiment of the invention provides a mechanism for:
  allowing kernel exits to be loaded dynamically;
  allowing multiple hook exits to coexist at a given functional location within the kernel;
  avoiding the rework of a kernel patch whenever the kernel is updated;
  avoiding the recompilation of the kernel whenever the modification is updated;
  allowing local variables in which the hook is placed to be read and updated by the exit; and allowing the exit to have certain serialisation conditions present on entry.

Referring again to FIG. 1, modules which use of the invention include for example a dynamic probe module 12. This comprises a Probe Definition File (PDF) generator 50 which passes a PDF file to a command program 52. The command program 52, instructs a first portion of the probe module, the probe manager, to register and arm a list of hook exits derived from the PDF file. When at least one dynamic probe hook exit for a hook is armed, the dispatcher 18 within the hook interface module 16 redirects program execution to a dynamic probes event handler (DPEH) portion of the probe module 12—this includes the modification functionality described above. In this case the functionality simply extracts information for a dynamic trace formatter 54 to enable a user to assess and monitor the operation of the kernel 10. The dynamic probe module 12 and its associated modules 50, 52 and 54 provide comparable functionality to the Dynamic Trace functions available for the OS/2 operating system from IBM Corporation, yet they need not be recompiled or updated to take into account variations in the kernel being monitored.

It is also possible that products from other companies such as SGI's Kernel Crash Dump for Linux 14 from Silicon Graphics Inc. could be adapted to operate both with the hook interface module and as illustrated in FIG. 1 complement the functionality of the dynamic probe module.

For example, the location jumped to by the dispatcher within the DPEH could be a command of the form "exit to" causing program execution to in turn jump, step 56, to, for example, a predefined location within module 14.

What is claimed is:

1. A hook interface module cooperable with a program whose functionality is to be modified and with at least one module providing said modified functionality, said program including at least one symbol indicating a respective point in said program execution where modification is permitted, said hook interface module comprising:

means for resolving an address for the at least one symbol;

means for maintaining a respective list indicative of any modification functions associated with each of the at least one symbol;

registration means for enabling said at least one module to register a modification function for a symbol with said interface module including means for adding an indicator for said modification function to the list for said symbol;

arming means for enabling said at least one module to arm at least one modification function associated with a respective symbol including means for modifying the contents of the address for the at least one respective symbol to cause program execution at said at least one respective symbol address to jump to a location in said hook interface module; and dispatching means, responsive to program execution jumping to said hook interface module, for causing program execution to, in turn, jump to any modification function associated with a symbol from which program execution has jumped.

2. A hook interface module according to claim 1 wherein said program is an operating system kernel.

3. A hook interface module according to claim 2 wherein said operating system is Linux and said at least one module is a privileged execution mode module.

4. A hook interface module according to claim 1 wherein at said modified functionality is additional enhanced functionality.

5. A hook interface module according to claim 1 further comprising de-registration means including means, responsive to a module request, for removing an indicator for a specified modification function from a list for a symbol.

6. A hook interface module according to claim 1 further comprising disarming means for enabling said at least one module to disarm at least one modification function associated with a respective symbol including means, responsive to no modification function being armed for a symbol, for modifying the contents of the address for said symbol to cause program execution at said at least one respective symbol address to continue within said program.

7. A hook interface module according to claim 1 wherein each of said at least one symbol identifies the start of a respective set of instructions further comprising:

an instruction causing program execution to jump to the end of said set of instructions;

a first set of one or more null operations;

a symbol identifying a location in said program to which said hook interface module can return after any modification function associated with said set of instructions completes; and wherein said modification means is adapted to replace said jump instruction with a second set of one or more null operations and to replace said first set of null operations with an instruction causing program execution to jump to said hook interface module.

8. A hook interface module according to claim 7 wherein said set of instructions further comprises:

one or more instructions for pushing one or more program parameters to a stack accessible to said hook interface module; and an instruction for cleaning up said stack when program execution returns after any modification function associated with said set of instructions completes; and wherein said dispatching means is adapted to pass said program parameters to any said modification functions.

9. A hook interface module according to claim 1 wherein said dispatching means comprises at least one dispatching routine associated with a respective symbol and a list of modification functions and wherein said modification means is adapted to modify the contents of the address for a symbol to cause program execution to jump to an associated dispatching routine.

10. A hook interface module according to claim 9, further comprising:

means, responsive to a module request to identify an additional symbol, for resolving an address for said additional symbol and instantiating a new dispatching routine with an associated list indicative of any modification functions associated with said additional symbol.

11. A hook interface module according to claim 1 wherein each element of said at least one list comprises a record, each record comprising:

an address for an associated modification function to which program execution jumps; and a flag indicative of a state of said modification function.

12. A hook interface module according to claim 11 wherein each of said at least one list comprises an ordered linked list indicative of an order in which any modification functions associated with a symbol should execute.

13. A method for interfacing a program whose functionality is to be modified with at least one module providing said modified functionality, said program including at least one symbol indicating a respective point in said program execution where modification is permitted, the method comprising the steps of:

resolving an address for the at least one symbol;

maintaining a respective list indicative of any modification functions associated with each of the at least one symbol;

said at least one module registering a modification function for a symbol with a hook interface module including adding an indicator for said modification function to the list for said symbol;

said at least one module arming at least one modification function associated with a respective symbol including modifying the contents of the address for the at least one respective symbol to cause program execution at said at least one respective symbol address to jump to a location in said hook interface module; and responsive to program execution jumping to said hook interface module, causing program execution to, in turn, jump to any modification function associated with a symbol from which program execution has jumped.

14. A computer program product comprising computer program code stored on a computer readable storage medium for, when executed on a computing device, interfacing a program whose functionality is to be modified with at least one module providing said modified functionality, said program including at least one symbol indicating a respective point in said program execution where modification is permitted, the program code comprising:

means for resolving an address for the at least one symbol;

means for maintaining a respective list indicative of any modification functions associated with each of the at least one symbol;

registration means for enabling said at least one module to register a modification function for a symbol with a hook interface module including means for adding an indicator for said modification function to the list for said symbol;

arming means for enabling said at least one module to arm at least one modification function associated with a respective symbol including means for modifying the contents of the address for the at least one respective symbol to cause program execution at said at least one respective symbol address to jump to a location in said hook interface module; and dispatching means, responsive to program execution jumping to said hook interface module, for causing program execution to, in turn, jump to any modification function associated with a symbol from which program execution has jumped.

* * * * *